(12) United States Patent
Zaghetto et al.

(10) Patent No.: US 11,076,152 B2
(45) Date of Patent: Jul. 27, 2021

(54) QUANTIZATION STEP PARAMETER FOR POINT CLOUD COMPRESSION

(71) Applicant: SONY CORPORATION, Tokyo (JP)

(72) Inventors: Alexandre Zaghetto, San Jose, CA (US); Danillo Graziosi, San Jose, CA (US); Ali Tabatabai, Cupertino, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/525,118

(22) Filed: Jul. 29, 2019

(65) Prior Publication Data

US 2020/0304792 A1    Sep. 24, 2020

Related U.S. Application Data

(60) Provisional application No. 62/819,830, filed on Mar. 18, 2019.

(51) Int. Cl.
*H04N 7/12* (2006.01)
*H04N 19/124* (2014.01)
*H04N 19/597* (2014.01)
*H04N 19/136* (2014.01)
*H04N 19/186* (2014.01)

(52) U.S. Cl.
CPC ......... *H04N 19/124* (2014.11); *H04N 19/136* (2014.11); *H04N 19/186* (2014.11); *H04N 19/597* (2014.11)

(58) Field of Classification Search
CPC .. H04N 13/128; H04N 13/161; H04N 19/436; H04N 19/597; H04N 13/122; H04N 13/15; H04N 13/178; H04N 13/189; H04N 19/186; H04N 9/646; H04N 19/176; H04N 19/70; H04N 5/21; H04N 19/124; H04N 19/46; H04N 19/50; H04N 19/51; H04N 19/513; H04N 19/52; H04N 19/587; H04N 19/88; H04N 2005/91314; H04N 2009/8084; H04N 2209/049; H04N 5/14; H04N 5/20; H04N 5/361; H04N 5/378; H04N 5/38; H04N 5/59; H04N 5/78266
USPC ....................................................... 375/240
See application file for complete search history.

(56) References Cited

U.S. PATENT DOCUMENTS

| | | | |
|---|---|---|---|
| 10,223,810 B2 | 3/2019 | Chou et al. | |
| 2007/0081734 A1* | 4/2007 | Sullivan | G06F 17/147 382/250 |
| 2014/0072237 A1* | 3/2014 | Tanizawa | H04N 19/176 382/233 |
| 2017/0347100 A1* | 11/2017 | Chou | G06T 9/001 |

FOREIGN PATENT DOCUMENTS

KR    10-2015-0089364 A    8/2015

OTHER PUBLICATIONS

Zhang, Cha, "Point Cloud Attribute Compression with Graph Transform", Microsoft Researsh.

* cited by examiner

*Primary Examiner* — Masum Billah
(74) *Attorney, Agent, or Firm* — Haverstock & Owens LLP

(57) ABSTRACT

A technique to parameterize the quantization scheme of the attribute coding of point cloud compression algorithms is described herein. Based on fixed-point arithmetic, the algorithm calculates the quantization step size (QS) in fixed-point notation, given a user-input quantization parameter (QP).

7 Claims, 4 Drawing Sheets

QUANTIZATION STEP PARAMETER FOR POINT CLOUD COMPRESSION

CROSS-REFERENCE TO RELATED APPLICATION(S)

This application claims priority under 35 U.S.C. § 119(e) of the U.S. Provisional Patent Application Ser. No. 62/819,830, filed Mar. 18, 2019 and titled, "QUANTIZATION STEP PARAMETER FOR POINT CLOUD COMPRESSION," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Point clouds have been considered as a candidate format for transmission of 3D data, either captured by 3D scanners, LIDAR sensors, or used in popular applications such as Virtual Reality/Augmented Reality (VR/AR). Point Clouds are a set of points in 3D space. Besides the spatial position (X,Y,Z), each point usually has associated attributes, such as color (R,G,B) or even reflectance and temporal timestamps (e.g., in LIDAR images). In order to obtain a high fidelity representation of the target 3D objects, devices capture point clouds in the order of thousands or even millions of points. Moreover, for dynamic 3D scenes used in VR/AR application, every single frame often has a unique dense point cloud, which results in the transmission of several millions of point clouds per second. For a viable transmission of such a large amount of data, compression is often applied.

In 2017, MPEG issued a call for proposal (CfP) for compression of point clouds. After evaluation of several proposals, MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. The method has proven to be more efficient than native 3D coding and is able to achieve competitive bitrates at acceptable quality.

When coding point clouds, TMC2 encodes auxiliary information related to the patch projection, such as patch position in the 2D canvas image and bounding box size. For temporal coding of auxiliary information, patch matching between patches from current point cloud and patches from the immediately decoded point cloud is used for prediction. The procedure is limited to the immediate neighbor and includes performing delta coding for all the frames in the sequence.

SUMMARY OF THE INVENTION

A technique to parameterize the quantization scheme of the attribute coding of point cloud compression algorithms is described herein. Based on fixed-point arithmetic, the algorithm calculates the quantization step size (QS) in fixed-point notation, given a user-input quantization parameter (QP).

In one aspect, a method programmed in a non-transitory memory of a device comprises acquiring three dimensional content, performing geometry coding of the three dimensional content and performing fixed-point attribute encoding utilizing quantization parameters. The quantization parameters are the same for chrominance and luminance. The quantization parameters are different for chrominance and luminance. A chrominance quantization parameter is proportional to a luminance quantization parameter. A chrominance quantization parameter is a function of a luminance quantization parameter. The quantization parameters correspond to quantization step sizes. A table is utilized for correspondence between the quantization parameters and the quantization step sizes.

In another aspect, an apparatus comprises a non-transitory memory for storing an application, the application for: acquiring three dimensional content, performing geometry coding of the three dimensional content and performing fixed-point attribute encoding utilizing quantization parameters and a processor coupled to the memory, the processor configured for processing the application. The quantization parameters are the same for chrominance and luminance. The quantization parameters are different for chrominance and luminance. A chrominance quantization parameter is proportional to a luminance quantization parameter. A chrominance quantization parameter is a function of a luminance quantization parameter. The quantization parameters correspond to quantization step sizes. A table is utilized for correspondence between the quantization parameters and the quantization step sizes.

In another aspect, a system comprises one or more devices for acquiring three dimensional content and an encoder for encoding the three dimensional content comprising: performing geometry coding of the three dimensional content and performing fixed-point attribute encoding utilizing quantization parameters. The quantization parameters are the same for chrominance and luminance. The quantization parameters are different for chrominance and luminance. A chrominance quantization parameter is proportional to a luminance quantization parameter. A chrominance quantization parameter is a function of a luminance quantization parameter. The quantization parameters correspond to quantization step sizes. A table is utilized for correspondence between the quantization parameters and the quantization step sizes.

DETAILED DESCRIPTION OF THE PREFERRED EMBODIMENT

A technique to parameterize the quantization scheme of the attribute coding of point cloud compression algorithms is described herein. Based on fixed-point arithmetic, the algorithm calculates the quantization step size (QS) in fixed-point notation, given a user-input quantization parameter (QP).

The MPEG (Moving Picture Experts Group) is currently defining the standard for point cloud compression (PCC). Point clouds are used to represent three-dimensional scenes and objects, and are composed by volumetric elements (voxels) described by their geometrical or appearance properties. The TMC13 is a test model software maintained and distributed by the MPEG that constantly incorporates new proposals approved by their contributors. The standard's compression scheme based on geometry properties, called G-PCC, is able to perform attribute coding using a quantization framework and is also implemented in the TMC13 software. Quantization is the process by which a range of values is mapped to a single value, thus resulting in a lossy compression scheme. In the context of G-PCC, quantization reduces the dynamic range of transformed attribute coefficients.

The compression of 3D data using 3D native technology is typically done using meshes or the spatial coordinates of the points that form a point cloud. Although either method could be used to represent 3D content, in some applications point clouds are preferred. In this last case, geometry compression can be successfully accomplished by means of octrees. In addition to geometry, attributes such as color and reflectance can also be compressed. In this case, transforms such as the region-adaptive hierarchical transform (RAHT) and the lifting transform are proven to be the most successful approaches. Most frequent applications of this compression architecture, which is contemplated in MPEG's test model software TMC13, involve static point clouds and dynamically acquired point clouds.

Previously, only QS was used for quantization purposes. Described herein is a mapping of QP to QS using fixed-point arithmetic. Moreover, by using fixed-point arithmetic to map QP into QS, it is possible to enable an RDO (Rate Distortion Optimization) framework based on QP. Furthermore, improved bit allocation is able to be performed between attribute channels by selecting different QPs per channel, for example, chrominance QP can be different than luminance QP.

QP allows for a finer rate distortion allocation and utilization of fixed-point arithmetic. Different quantization parameters for luminance and chrominance are able to be used, or generate a relationship between the QPs of different attribute channels.

Figure 1:
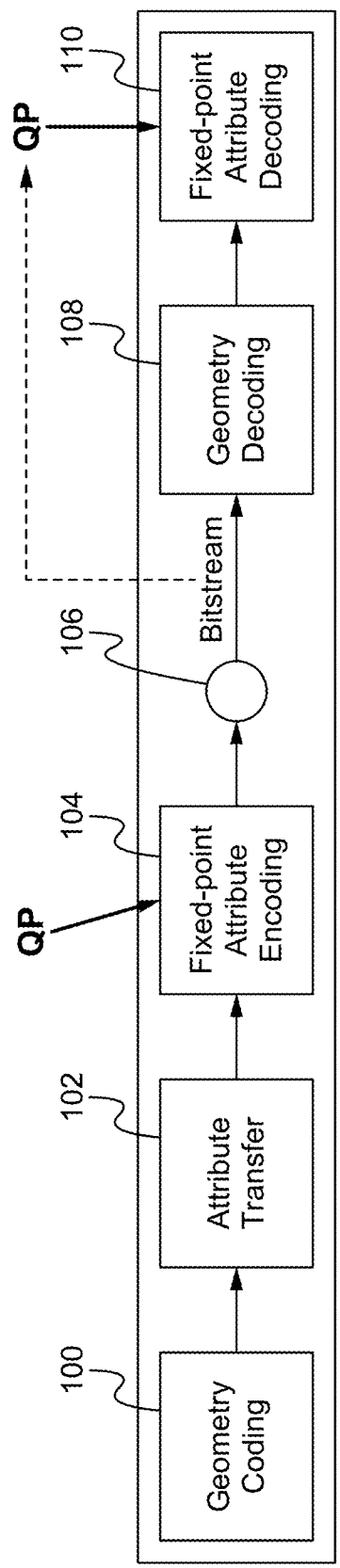
FIG. 1 illustrates a flowchart of a method of attribute encoding according to some embodiments.

FIG. 1 illustrates a flowchart of a method of attribute encoding according to some embodiments. Point cloud data typically contains geometry and color attribute information. In the step 100, geometry coding of three dimensional content (e.g., point cloud) is implemented. The geometry coding is able to be implemented in any manner such as 3D native coding technology (based on octree and similar coding methods), or 3D to 2D projection, followed by traditional video coding. In the step 102, attribute transfer is performed. In the step 104, fixed-point attribute encoding occurs. For color and attribute coding, graph transform is able to be used. The fixed-point attribute encoding sends a QP instead of a QS in the bitstream. In some embodiments, the same QP is used for Luma and Chroma, and in some embodiments, a different QP is used. Using different QPs for chrominance and luminance enables improved bit allocation. QP is sent instead of QS in the TMC13 bitstream. Updated configuration files use QP instead of QSLuma or QSChroma. In the step 106, the bitstream is encoded. After, the geometry coding and fixed-point attribute encoding, the bitstream is generated and transmitted to a decoder. In the step 108, geometry decoding is implemented. Geometry decoding is configured based on the geometry coding to ensure a proper decoding. In the step 110, fixed-point attribute decoding is performed. The fixed-point attribute decoding utilizes the QP, which is transmitted in the bitstream. In some embodiments, fewer or additional steps are implemented. In some embodiments, the order of the steps is modified.

The following table shows the correspondence between QS and QP for CTC conditions:

| Rate | quantizationStepLuma | quantQPFactor |
| --- | --- | --- |
| r01 | 256 | 52 |
| r02 | 128 | 46 |
| r03 | 64 | 40 |
| r04 | 32 | 34 |
| r05 | 16 | 28 |
| r06 | 8 | 22 |

The quantization step $\Delta_{step}$ is obtained from a quantization parameter QP using Equation 1.

$$\Delta_{step}(QP) = 2^{(QP-\alpha)/6} \times 2^{\lfloor QP/6 \rfloor} \quad (1)$$

Using a fixed-point notation (scale k), Equation 1 becomes, $$\Delta_{step}(QP) = \Delta_0[QP\%6] \times 2^{\lfloor QP/6 \rfloor} \quad (2)$$

where, $$\Delta_0 = \{2^{-\alpha/6}, 2^{-\alpha+1/6}, 2^{-\alpha+3/6}, 2^{-\alpha+4/6}, 2^{-\alpha+5/6}\} << k \quad (3)$$

Assuming $\alpha=4$ and $k=8$, the quantization is obtained:

$$\Delta_0 = \{161, 181, 203, 228, 256, 287\}. \quad (4)$$

Once the quantization of the transformed attribute is performed in terms of QP, the Lagrangian rate-distortion functional J is able to be defined as:

$$J(QP) = R(QP) + \lambda(QP)D(QP)$$

The bitrate distribution between luminance and chrominance is controlled by QP.

Considering that luminance and chrominance have specific characteristics, different QPs for each channel are able to be used in order to achieve better bit allocation. QPL (QP for luminance) and QPC (QP for chrominance) are the quantization parameters for Luma and Chroma, respectively. Therefore, QPC as a function of QPL is:

$$QPC = \varphi(QPL).$$

Considering that different attributes have specific characteristics, different QPs are able to be used for each attribute in order to achieve better bit allocation. QP is able to be a base quantization parameter and $QPA_{0...n-1}$ is able to be the quantization parameters for attributes $A_0$ and $A_{n-1}$. $QPA_i$ is written as a function of QP:

$$QPA_i = \Psi_i(QP), i=0 \ldots n-1.$$

Figure 2:
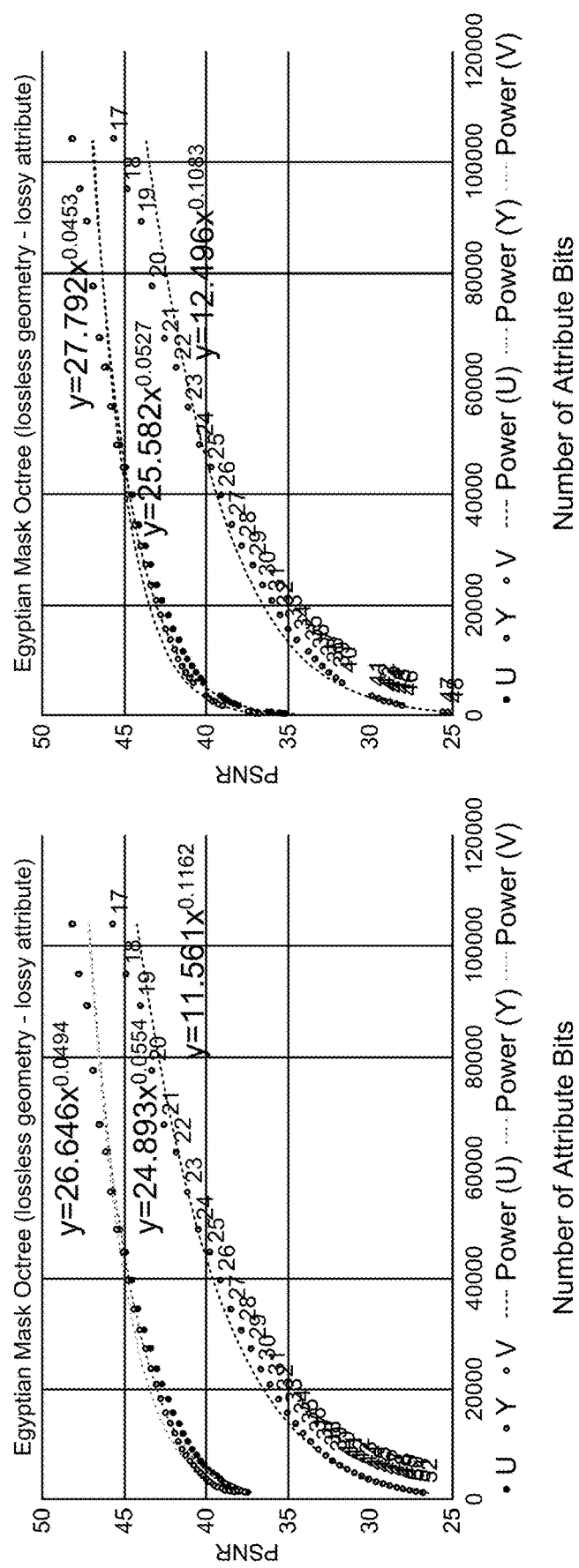
FIGS. 2 and 3 illustrate results for region-adaptive hierarchical transform (RAHT) utilizing the QP according to some embodiments.
Figure 3:
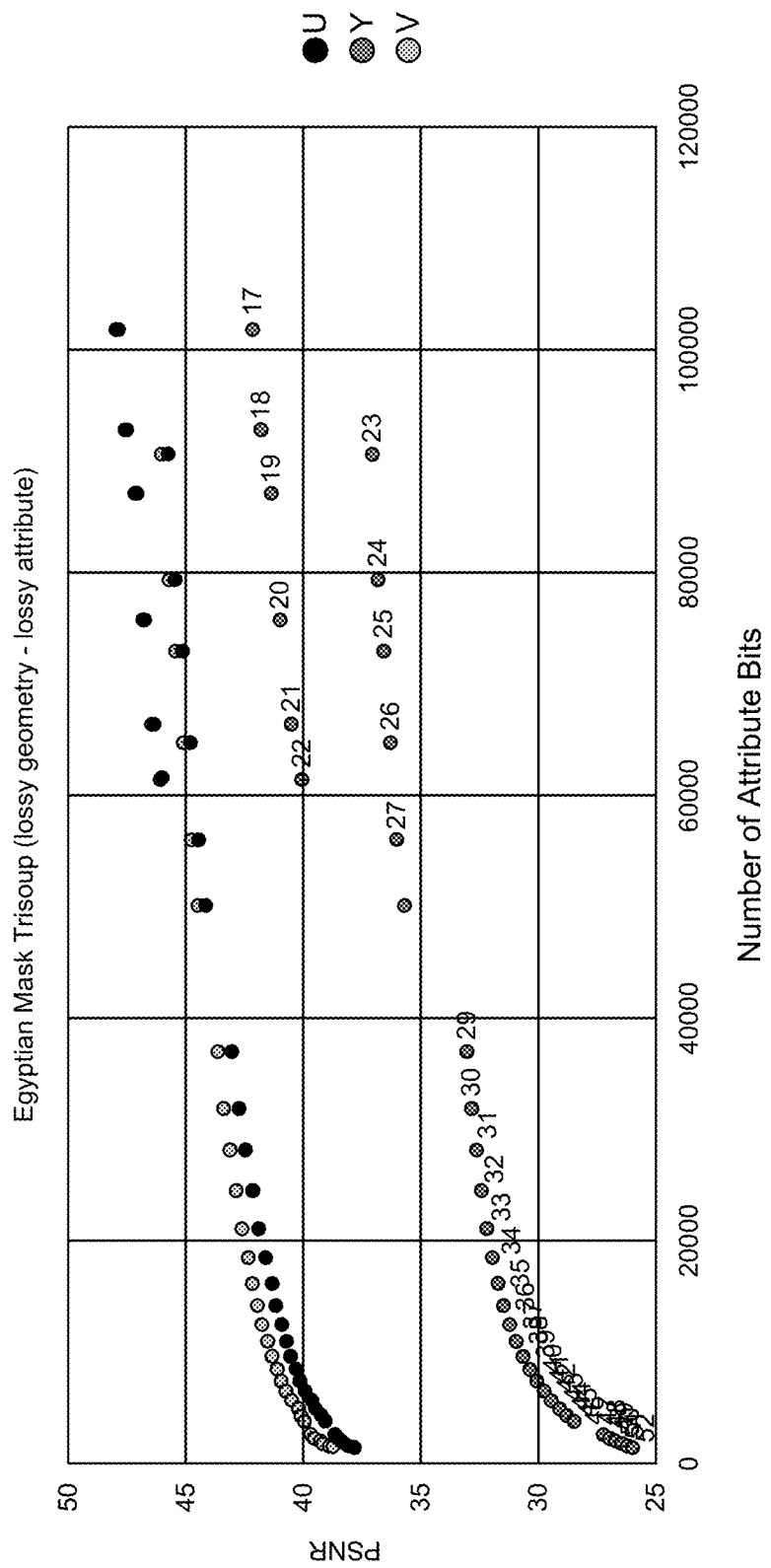

FIGS. 2 and 3 illustrate results for RAHT utilizing the QP according to some embodiments.

Figure 4:
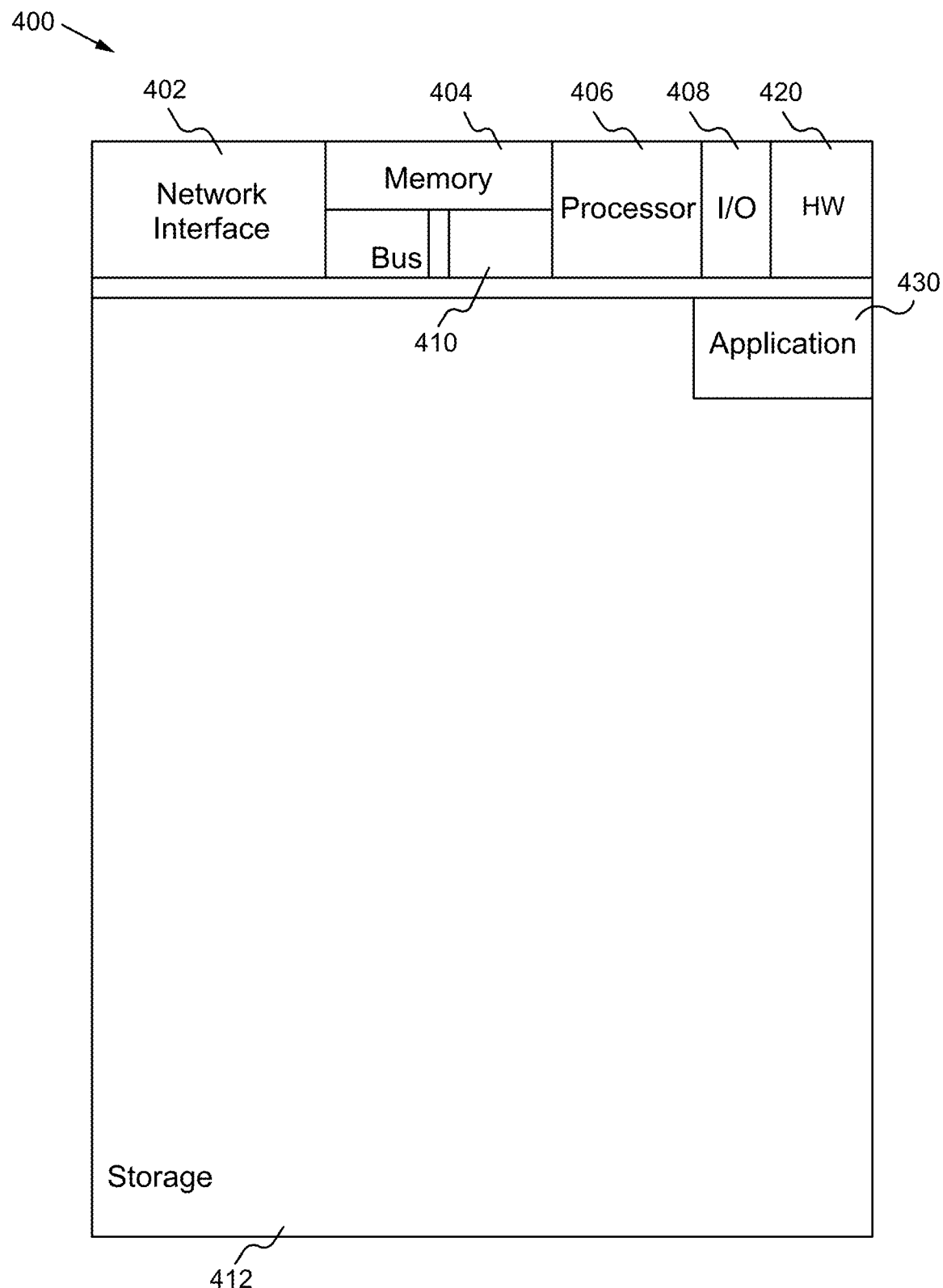
FIG. 4 illustrates a block diagram of an exemplary computing device configured to implement the QP point cloud compression method according to some embodiments.

FIG. 4 illustrates a block diagram of an exemplary computing device configured to implement the QP point cloud compression method according to some embodiments. The computing device 400 is able to be used to acquire, store, compute, process, communicate and/or display information such as images and videos including 3D content. The computing device 400 is able to implement any of the point cloud compression aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. QP point cloud compression application(s) 430 used to implement the QP point cloud compression method are likely to be stored in the storage device 412 and memory 404 and processed as applications are typically processed. More or fewer components shown in FIG. 4 are able to be included in the computing device 400. In some embodiments, QP point cloud compression hardware 420 is included. Although the computing device 400 in FIG. 4 includes applications 430 and hardware 420 for the QP point cloud compression method, the QP point cloud compression method is able to be implemented on a computing device in hardware, firmware, software or any combination thereof. For example, in some embodiments, the QP point cloud compression applications 430 are programmed in a memory and executed using a processor. In another example, in some embodiments, the QP point cloud compression hardware 420 is programmed hardware logic including gates specifically designed to implement the QP point cloud compression method.

In some embodiments, the QP point cloud compression application(s) 430 include several applications and/or modules. In some embodiments, modules include one or more sub-modules as well. In some embodiments, fewer or additional modules are able to be included.

In some embodiments, the QP point cloud compression hardware 420 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the QP point cloud compression method, a device acquires or receives 3D content and processes and/or sends the content in an optimized manner to enable proper, efficient display of the 3D content. The QP point cloud compression method is able to be implemented with user assistance or automatically without user involvement.

In operation, the QP point cloud compression method enables a finer rate-distortion allocation using QP instead of QS, in addition to the use of different QPs for Luma and Chroma, or any given set of attributes, which allows for better bitrate allocation.

Some Embodiments Of Quantization Step Parameter For Point Cloud Compression

1. A method programmed in a non-transitory memory of a device comprising:
   acquiring three dimensional content;
   performing geometry coding of the three dimensional content; and
   performing fixed-point attribute encoding utilizing quantization parameters.
2. The method of clause 1 wherein the quantization parameters are the same for chrominance and luminance.
3. The method of clause 1 wherein the quantization parameters are different for chrominance and luminance.
4. The method of clause 3 wherein a chrominance quantization parameter is proportional to a luminance quantization parameter.
5. The method of clause 3 wherein a chrominance quantization parameter is a function of a luminance quantization parameter.
6. The method of clause 1 wherein the quantization parameters correspond to quantization step sizes.
7. The method of clause 6 wherein a table is utilized for correspondence between the quantization parameters and the quantization step sizes.
8. An apparatus comprising:
   a non-transitory memory for storing an application, the application for:
     acquiring three dimensional content;
     performing geometry coding of the three dimensional content; and
     performing fixed-point attribute encoding utilizing quantization parameters; and
   a processor coupled to the memory, the processor configured for processing the application.
9. The apparatus of clause 8 wherein the quantization parameters are the same for chrominance and luminance.
10. The apparatus of clause 8 wherein the quantization parameters are different for chrominance and luminance.
11. The apparatus of clause 10 wherein a chrominance quantization parameter is proportional to a luminance quantization parameter.
12. The apparatus of clause 10 wherein a chrominance quantization parameter is a function of a luminance quantization parameter.
13. The apparatus of clause 8 wherein the quantization parameters correspond to quantization step sizes.
14. The apparatus of clause 13 wherein a table is utilized for correspondence between the quantization parameters and the quantization step sizes.
15. A system comprising:
    one or more devices for acquiring three dimensional content; and
    an encoder for encoding the three dimensional content comprising:
      performing geometry coding of the three dimensional content; and
      performing fixed-point attribute encoding utilizing quantization parameters.
16. The system of clause 15 wherein the quantization parameters are the same for chrominance and luminance.
17. The system of clause 15 wherein the quantization parameters are different for chrominance and luminance.
18. The system of clause 17 wherein a chrominance quantization parameter is proportional to a luminance quantization parameter.
19. The system of clause 17 wherein a chrominance quantization parameter is a function of a luminance quantization parameter.
20. The system of clause 15 wherein the quantization parameters correspond to quantization step sizes.

21. The system of clause 20 wherein a table is utilized for correspondence between the quantization parameters and the quantization step sizes.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    acquiring three dimensional content;
    performing geometry coding of the three dimensional content; and
    performing fixed-point attribute encoding utilizing quantization parameters, wherein the quantization parameters are different for chrominance and luminance, and
    wherein a chrominance quantization parameter is a function of a luminance quantization parameter which enables improved bit allocation,
    wherein the chrominance quantization parameter is proportional to the luminance quantization parameter and further wherein the quantization parameters correspond to quantization step sizes.

2. The method of claim 1 wherein a table is utilized for correspondence between the quantization parameters and the quantization step sizes.

3. An apparatus comprising:
    a non-transitory memory for storing an application, the application for:
        acquiring three dimensional content;
        performing geometry coding of the three dimensional content; and
        performing fixed-point attribute encoding utilizing quantization parameters,
        wherein the quantization parameters are different for chrominance and luminance,
        wherein a chrominance quantization parameter is a function of a luminance quantization parameter which enables improved bit allocation,
        wherein the chrominance quantization parameter is proportional to the luminance quantization parameter and further wherein the quantization parameters correspond to quantization step sizes; and
    a processor coupled to the memory, the processor configured for processing the application.

4. The apparatus of claim 3 wherein a table is utilized for correspondence between the quantization parameters and the quantization step sizes.

5. A system comprising:
    one or more devices for acquiring three dimensional content; and
    an encoder for encoding the three dimensional content comprising:
        performing geometry coding of the three dimensional content; and
        performing fixed-point attribute encoding utilizing quantization parameters, wherein the quantization parameters are different for chrominance and luminance,
    wherein a chrominance quantization parameter is a function of a luminance quantization parameter which enables improved bit allocation,
    wherein the chrominance quantization parameter is proportional to the luminance quantization parameter and further wherein the quantization parameters correspond to quantization step sizes.

6. The system of claim 5 wherein a table is utilized for correspondence between the quantization parameters and the quantization step sizes.

7. The system of claim 6 wherein the table comprises a rate, a quantization step size and a quantization parameter factor.

* * * * *